(12) United States Patent  
Hawkins, Jr.

(10) Patent No.: US 8,424,848 B1  
(45) Date of Patent: Apr. 23, 2013

(54) VEHICLE JACK FOR USE ON VEHICLES TO CHANGE TIRES AND FOR OTHER PURPOSES

(76) Inventor: Melvin L. Hawkins, Jr., Los Angeles, CA (US)

( * ) Notice: Subject to any disclaimer, the term of this patent is extended or adjusted under 35 U.S.C. 154(b) by 1102 days.

(21) Appl. No.: 12/378,518

(22) Filed: Feb. 17, 2009

Related U.S. Application Data

(63) Continuation-in-part of application No. 11/706,817, filed on Feb. 13, 2007, now abandoned, which is a continuation-in-part of application No. 10/869,536, filed on Jun. 15, 2004, now abandoned.

(60) Provisional application No. 60/478,610, filed on Jun. 16, 2003.

(51) Int. Cl.  
*B60S 9/02* (2006.01)

(52) U.S. Cl.  
USPC .......................................................... 254/423

(58) Field of Classification Search .................... 254/423  
See application file for complete search history.

(56) References Cited

U.S. PATENT DOCUMENTS

| | | | |
|---|---|---|---|
| 1,279,500 A * | 9/1918 | Berry ............................ | 254/423 |
| 1,344,037 A * | 6/1920 | Heymann ..................... | 254/423 |
| 1,952,127 A * | 3/1934 | Goldman ...................... | 254/423 |
| 1,957,151 A * | 5/1934 | Pollard ......................... | 254/423 |
| 1,972,552 A * | 9/1934 | Donovan .................. | 254/93 VA |
| 2,442,881 A * | 6/1948 | Soskin ......................... | 254/423 |
| 2,600,750 A * | 6/1952 | Gaudet et al. ................ | 417/549 |
| 2,646,250 A * | 7/1953 | Fuster ......................... | 254/423 |
| 2,919,106 A * | 12/1959 | Le Mieux et al. ............. | 254/423 |
| 3,064,994 A * | 11/1962 | Limmer ....................... | 280/6.15 |
| 3,093,362 A * | 6/1963 | Schaefer ...................... | 254/424 |
| 3,166,298 A * | 1/1965 | Di Stefano ................... | 254/423 |
| 3,186,686 A * | 6/1965 | Mayer .......................... | 254/423 |
| 3,597,121 A * | 8/1971 | McClocklin ................. | 417/400 |
| 3,687,015 A * | 8/1972 | Chavarria ....................... | 92/53 |
| 3,753,629 A * | 8/1973 | Jackson ....................... | 417/388 |
| 3,788,769 A * | 1/1974 | Glass et al. .................... | 417/26 |
| 4,061,309 A * | 12/1977 | Hanser ......................... | 254/423 |
| 4,093,406 A * | 6/1978 | Miller .......................... | 417/401 |
| 4,150,813 A * | 4/1979 | Mena ........................... | 254/423 |
| 4,165,861 A * | 8/1979 | Hanser ......................... | 254/423 |
| 4,174,094 A * | 11/1979 | Valdespino et al. .......... | 254/423 |
| 4,426,845 A * | 1/1984 | Brooks et al. .................. | 60/347 |
| 4,433,620 A * | 2/1984 | Kiyosawa ...................... | 100/43 |
| 4,597,584 A * | 7/1986 | Hanser ....................... | 280/6.153 |
| 4,635,904 A * | 1/1987 | Whittingham ............... | 254/425 |
| 4,743,037 A * | 5/1988 | Hanser ....................... | 280/6.153 |

(Continued)

*Primary Examiner* — Lee D Wilson  
*Assistant Examiner* — Jamal Daniel  
(74) *Attorney, Agent, or Firm* — Emery L. Tracy

(57) ABSTRACT

A jack apparatus for lifting a vehicle is provided. The apparatus comprises a base, a bottom segment attached to the base and telescoping within a middle segment, and the middle segment telescoping within a top segment. A platform is attached to the vehicle with the top segment only being attached to the platform. A safety clip is secured to the top segment only and extends toward a tire contacting the vehicle. A hydraulic motor is located within one of the segments. An air compressor is attached to the vehicle. A plurality of hydraulic lines are provided with each hydraulic line being attached to the air compressor and the hydraulic motor. A control panel is mounted on a dashboard within the vehicle and attached to the air compressor with a plurality of switches for controlling the hydraulic motor wherein the base has a diameter greater than any of the segments.

6 Claims, 3 Drawing Sheets

U.S. PATENT DOCUMENTS

| | | | | |
|---|---|---|---|---|
| 4,746,133 A * | 5/1988 | Hanser et al. | | 280/6.153 |
| 4,859,006 A * | 8/1989 | Philippe et al. | | 305/148 |
| 4,993,688 A * | 2/1991 | Mueller et al. | | 254/423 |
| 5,143,386 A * | 9/1992 | Uriarte | | 254/418 |
| 5,176,391 A * | 1/1993 | Schneider et al. | | 280/6.153 |
| 5,188,379 A * | 2/1993 | Krause et al. | | 254/423 |
| 5,219,429 A * | 6/1993 | Shelton | | 254/423 |
| 5,224,688 A * | 7/1993 | Torres et al. | | 254/423 |
| 5,232,206 A * | 8/1993 | Hunt et al. | | 254/423 |
| 5,312,119 A * | 5/1994 | Schneider et al. | | 280/766.1 |
| D348,966 S * | 7/1994 | Guyton | | D34/31 |
| 5,377,957 A * | 1/1995 | Mosley | | 254/423 |
| 5,441,237 A * | 8/1995 | Sweeney | | 254/93 HP |
| 5,465,940 A * | 11/1995 | Guzman et al. | | 254/423 |
| 5,628,521 A * | 5/1997 | Schneider et al. | | 280/6.153 |
| 5,636,830 A * | 6/1997 | Chartrand | | 254/423 |
| 5,639,065 A * | 6/1997 | Lin | | 254/421 |
| 5,676,385 A * | 10/1997 | Schneider et al. | | 280/6.153 |
| 5,713,560 A * | 2/1998 | Guarino | | 254/423 |
| 5,722,641 A * | 3/1998 | Martin et al. | | 254/423 |
| 5,765,810 A * | 6/1998 | Mattera | | 254/423 |
| 5,890,721 A * | 4/1999 | Schneider et al. | | 280/6.153 |
| 5,913,525 A * | 6/1999 | Schneider et al. | | 280/6.153 |
| 5,915,700 A * | 6/1999 | Schneider et al. | | 280/6.153 |
| 5,931,500 A * | 8/1999 | Dagnese | | 280/766.1 |
| 6,050,573 A * | 4/2000 | Kunz | | 280/6.153 |
| 6,079,742 A * | 6/2000 | Spence | | 280/766.1 |
| 6,086,099 A * | 7/2000 | Kingsbury | | 280/766.1 |
| 6,105,940 A * | 8/2000 | Charette | | 254/423 |
| 6,305,667 B1 * | 10/2001 | Heller | | 254/93 R |
| D467,699 S * | 12/2002 | King | | D34/31 |
| 6,527,254 B1 * | 3/2003 | Prevete | | 254/423 |
| 6,832,402 B1 * | 12/2004 | Drago et al. | | 7/100 |
| 6,848,693 B2 * | 2/2005 | Schneider | | 280/6.153 |
| 6,895,648 B1 * | 5/2005 | Willett | | 29/402.08 |
| 6,910,680 B1 * | 6/2005 | Geller | | 254/423 |
| 6,913,248 B1 * | 7/2005 | Schmitz | | 254/423 |
| 6,948,702 B1 * | 9/2005 | Nigro | | 254/423 |
| 6,991,221 B1 * | 1/2006 | Rodriguez | | 254/423 |
| 7,004,457 B2 * | 2/2006 | Jackson et al. | | 254/423 |
| 7,044,445 B1 * | 5/2006 | Crawford | | 254/425 |
| 7,063,307 B2 * | 6/2006 | Williams, Sr. | | 254/423 |
| 7,243,907 B2 * | 7/2007 | Singh et al. | | 254/423 |
| 7,290,799 B2 * | 11/2007 | Santos | | 280/766.1 |
| 7,296,784 B2 * | 11/2007 | Peter | | 254/418 |
| 7,334,777 B2 * | 2/2008 | Jackson | | 254/423 |
| 2004/0155231 A1 * | 8/2004 | Tsatsis | | 254/423 |
| 2005/0127343 A1 * | 6/2005 | Jackson et al. | | 254/423 |

* cited by examiner

VEHICLE JACK FOR USE ON VEHICLES TO CHANGE TIRES AND FOR OTHER PURPOSES

The present application is a continuation-in-part of U.S. patent application Ser. No. 11/706,817, filed on Feb. 13, 2007 now abandoned, entitled "Vehicle Jack for Use on Vehicles to Change Tires and for Other Purposes", which is a continuation-in-part of U.S. patent application Ser. No. 10/869,536, filed on Jun. 15, 2004, now abandoned, entitled "Vehicle Jack for Use on Vehicles to Change Tires and for Other Purposes", which claims the benefit of priority of U.S. Provisional Application No. 60/478,610, filed Jun. 16, 2003.

BACKGROUND OF THE INVENTION

1. Field of the Invention

This invention relates generally to a vehicle jack for use on vehicles and, more particularly, the invention relates to a vehicle jack for use on vehicles to change tires and for other purposes 2. Description of the Prior Art Millions of Americans rely on the automobile on a daily basis to transport them to their desired destination. Because of the mechanical nature of an automobile, however, malfunctions and problems are inevitable. One of the most commonly experienced problems associated with cars is having a flat tire.

To change a flat tire, a standard vehicle jack and lug wrench is generally used to raise the vehicle and remove the lug nuts from the tire. A standard jack and lug wrench often requires a certain amount of mechanical know-how and physical strength for use. Coupled with the fact that the consumer generally wants to get the tire changed and be on their way, makes a flat tire a disgruntling situation. This is especially true when problems must be addressed by the roadside during nighttime hours. Changing a flat tire on the side of a dark road is unsafe and quite difficult for many consumers, particularly for individuals with back problems and older individuals.

SUMMARY

The present invention is a jack apparatus for lifting sections of a vehicle in combination with a vehicle. The vehicle includes a frame and four tires. The jack apparatus comprises a base, a bottom segment having a top end and a bottom end with the bottom end of the bottom segment attached to the base, a middle segment having a top end and a bottom end with the top end of the bottom segment telescoping within the bottom end of the middle segment, and a top segment having a top end and a bottom end with the top end of the middle segment telescoping within the bottom end of the top segment. A flat platform is fixedly attached to the frame of the vehicle with the top end of the top segment only being attached to the platform. A safety clip is secured to the top segment only and extends in a general direction toward a tire with the safety clip contacting an underside of the vehicle. A hydraulic motor is located within one of the segments. An air compressor is attached to the vehicle. A plurality of hydraulic lines are provided with each line having a first end and a second end, the first end of each hydraulic line being attached to the air compressor, and the second end of each hydraulic line being attached to the hydraulic motor. A control panel is mounted on a dashboard within an interior of the vehicle with the control panel being attached to the air compressor and having a plurality of switches for controlling the hydraulic motor wherein the base has a diameter greater than any of the segments.

The present invention further includes an apparatus for lifting sections of a vehicle in combination with a vehicle. The vehicle includes a frame and a driver's side and a passenger's side including four tires. The apparatus comprises a first scissors jack having a first leg and a second leg with each of the legs having a first end and a second end and the legs crossing one another at the midpoint of each leg. A second scissors jack is provided having a first leg and a second leg with each of the legs having a first end and a second end and the legs crossing one another at the midpoint of each leg. A hydraulic motor is located within each jack. An air compressor is attached to the vehicle. A plurality of hydraulic lines are provided with each line having a first end and a second end with the first end of each hydraulic line attached to the air compressor and the second end of each hydraulic line attached to a hydraulic motor located within the jacks. A control panel is mounted on a dashboard within an interior of the vehicle with the control panel attached to the air compressor and the control panel having a plurality of switches for controlling each jack independently of each other wherein the first end of the legs of both the first scissors jack and the second scissors jack are fixedly secured to the frame of the vehicle between the wheels of a driver's side of the vehicle and wherein the legs of both the first scissors jack and the second scissors jack retract against the frame when the vehicle is lowered.

DETAILED DESCRIPTION OF THE PREFERRED EMBODIMENTS

As illustrated in FIGS. 1-5, the present invention is a vehicle jack for use on vehicles comprising four separate jacks on the frame of a vehicle. Each of the jacks can be operated independently through a control panel that can be accessed by people within the vehicle. Each of the jacks operates via an independent hydraulic motor and is connected to power means of the vehicle, preferably the vehicle battery. The jacks used in this invention have several different embodiments, as noted below in the various figures.

Figure 1:
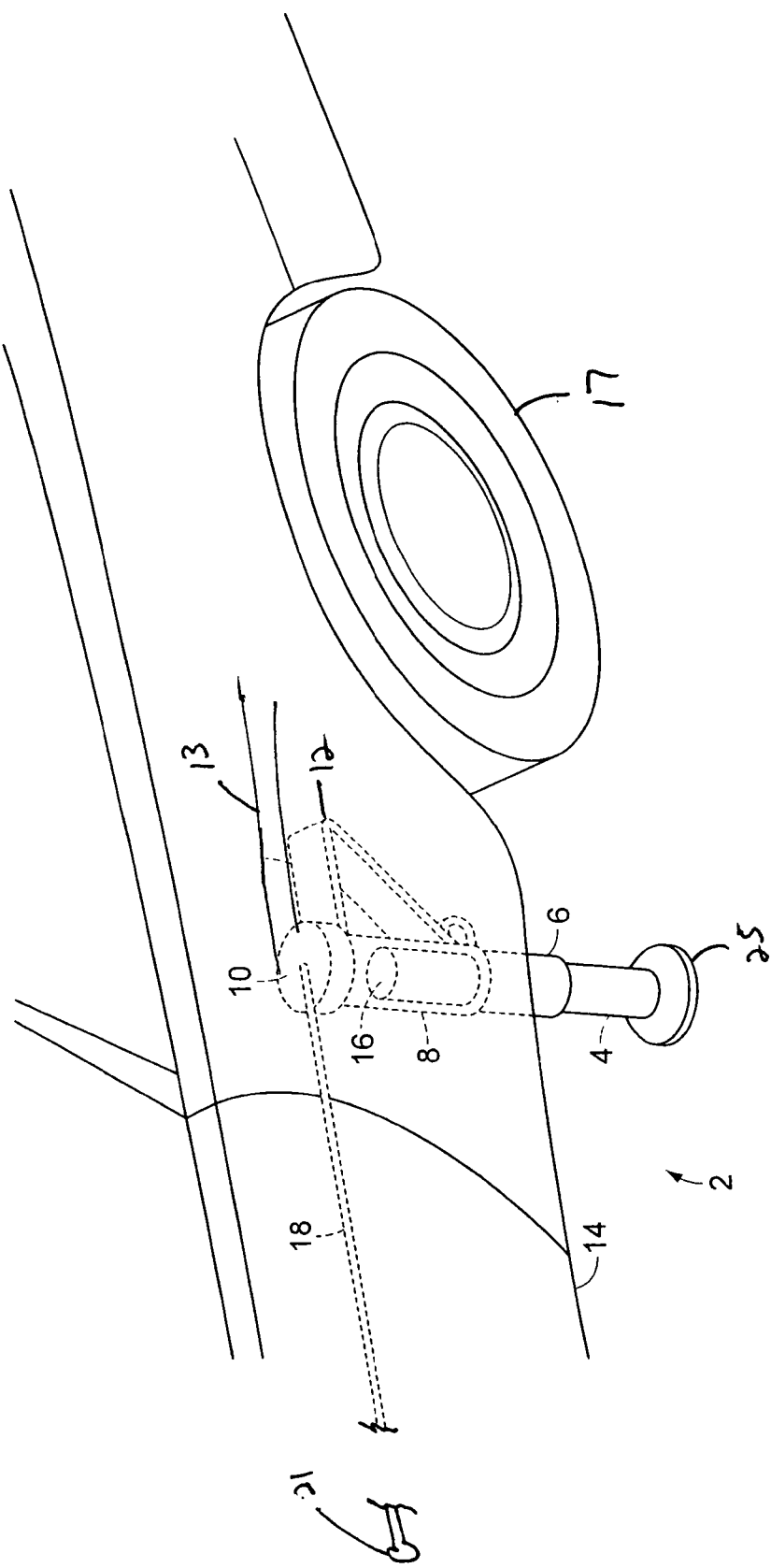
FIG. 1 is a perspective view illustrating a vehicle jack for use on vehicles, constructed in accordance with the present invention.

FIG. 1 illustrates a perspective view of the talon jack embodiment 2 of the present invention. The talon jack 2 has at least three segments 4, 6, and 8, with the segment 4 being the bottom segment. The talon jack 2 also has a base 25. The segment 4 telescopes within the segment 6, which in turn telescopes into the segment 8. Each of the segments has two ends, a top end and a bottom end. The bottom end of the segment 4 is attached to the base 25, while the top end of the segment 4 is telescoping within the bottom end of the segment 6. The top end of the segment 6 is telescoping within the bottom end of the segment 8.

The top end of segment 8 has a platform 10, which has a top surface. The top surface of the platform 10 is the surface placed against the frame 13 of a vehicle 14. A safety clip 12 is attached to the segment 8, with the safety clip 12 giving some additional support by also being placed against the underside of a vehicle 14. Each jack 2 in this embodiment is attached to the frame 13 adjacent to a vehicle tire 17, with this embodiment having four jacks 2 present.

A hydraulic motor 16, located within the segment 8, is connected via a hydraulic line 18 to an air compressor 21 that is located within the vehicle. Each hydraulic line 18 has two ends, a first end and a second end, with the second end of the hydraulic line 18 being attached to a hydraulic motor 16 and the first end of each hydraulic line 18 being attached to the air compressor 21. The air compressor 21, in turn, is connected to a control panel that is located within the vehicle.

Figure 2:
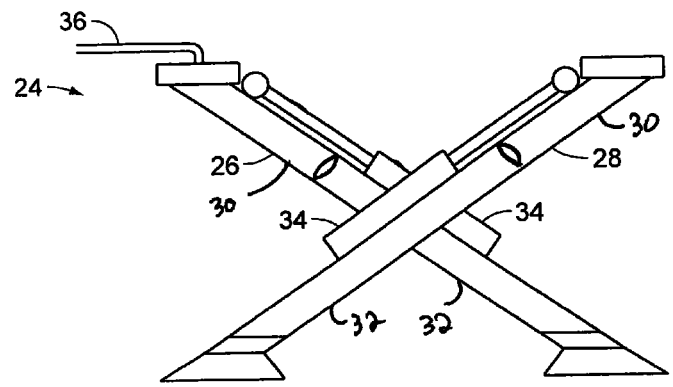
FIG. 2 is an elevational side view illustrating a scissor design embodiment of the vehicle jack for use on vehicles, constructed in accordance with the present invention.

FIG. 2 illustrates a perspective view of the scissor design embodiment of the present invention. The scissors jack 24 has two legs, a first leg 26 and a second leg 28. Each of these two legs has two ends, a first end and a second end, with the legs overlapping one another at the midpoint of each leg. The first end of the legs 26, 28 are fixedly secured to the frame of the vehicle between the wheels of the vehicle by welding or other means with the jack 24 retracting against the frame when the vehicle is lowered. It is important that the first end of the legs 26 are spaced from each other providing better support for the vehicle when the scissors jack 24 is operated.

Each leg 26, 28 preferably has at least two segments, an inner segment 30 and an outer segment 32, with a hydraulic motor 34 and a hydraulic arm 36 attached to each of the outer segments 32. Each of the hydraulic motors 34 is attached via a connection 36 to a control panel that is the dashboard of a vehicle.

Figures 3, 4:
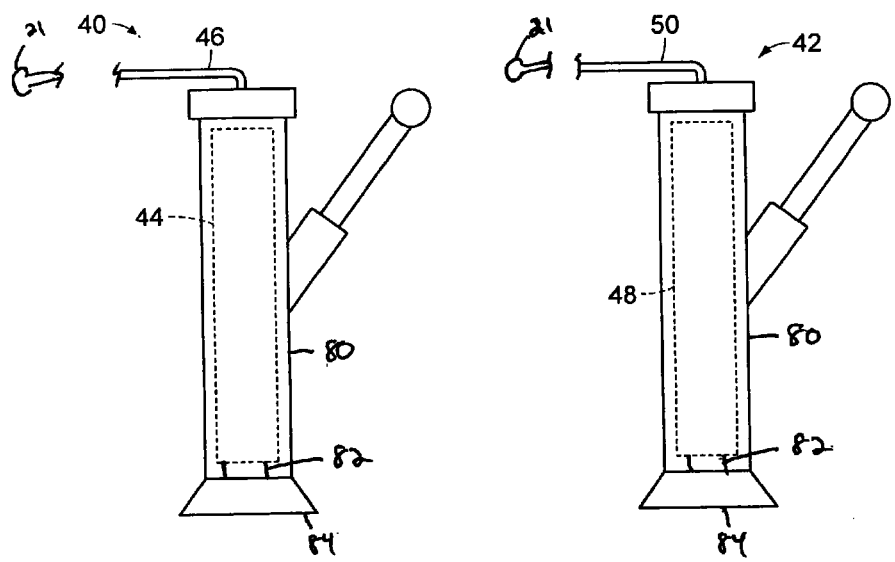
FIG. 3 is an elevational side view illustrating a first servo hydraulic embodiment of the vehicle jack for use on vehicles, constructed in accordance with the present invention.
FIG. 4 is an elevational side view illustrating a second servo hydraulic embodiment of the vehicle jack for use on vehicles, constructed in accordance with the present invention.

FIG. 3 illustrates a perspective view of a first servo hydraulic embodiment 40 of the present invention, while FIG. 4 illustrates a perspective view of a second servo hydraulic embodiment 42 of the present invention. The first servo hydraulic embodiment 40 has a motor 44 which is connected via a hydraulic line 46 to an air compressor 21 that is attached to a control panel within the vehicle, while the second servo hydraulic embodiment 42 has a motor 48 which is connected via hydraulic line 50 to an air compressor 21 that is attached to the control panel within the vehicle.

In FIGS. 3 and 4, each embodiment includes an outer casing 80 which houses the servo motor. In addition, each of these embodiments has a bottom-mounted hydraulic ram 82 which is pushed downward by the servo motor once it is engaged, with the bottom end of the hydraulic ram 82 attached to the base 84 of these embodiments.

Figure 5:
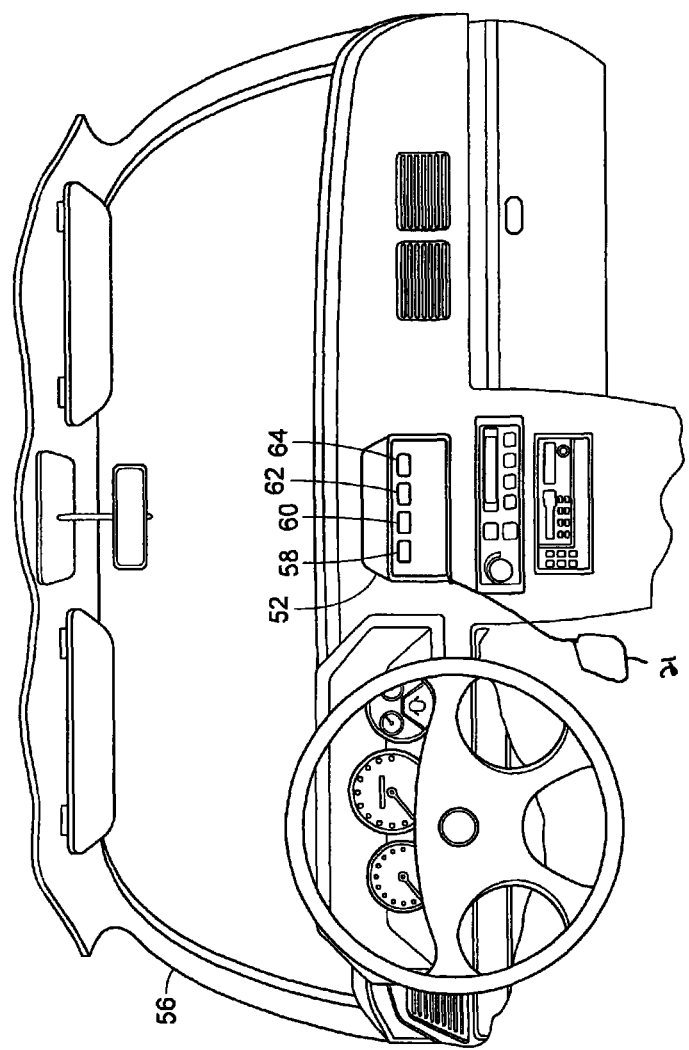
FIG. 5 is a representational view illustrating a control panel for the vehicle jack for use on vehicles, constructed in accordance with the present invention, with the control panel on a dashboard within the vehicle.

FIG. 5 illustrates a representation of a control panel 52 on a dashboard 54 within the vehicle 56. The control panel 52 has at least four separate buttons, including a left rear button 58, a left front button 60, a right front button 62, and a right rear button 64. Each of the buttons automatically deploys the jack that is associated with the appropriate button. Safeguards are be built in so as to not allow the jacks to deploy when the vehicle 56 is moving. The control panel 52 itself is electronically attached to the air compressor 21.

The representation of a control panel 52 on a dashboard 54 within the vehicle 56 in FIG. 5 is only meant to be a representational diagram. The control panel 52 could have other additional functions not disclosed herein, and still fall within the scope of the claims of the present invention.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A jack apparatus for lifting sections of a vehicle in combination with a vehicle, the vehicle including a frame, the vehicle including four tires, the apparatus comprising:
    a base;
    a bottom segment having a top end and a bottom end, the bottom end of the bottom segment attached to the base;
    a middle segment having a top end and a bottom end, the top end of the bottom segment telescoping within the bottom end of the middle segment;
    a top segment having a top end and a bottom end, the top end of the middle segment telescoping within the bottom end of the top segment;
    a flat platform fixedly attached to the frame of the vehicle, the top end of the top segment only being attached to the platform;
    a safety clip secured to the top segment only and extending in a general direction toward a tire, the safety clip contacting an underside of the vehicle;
    a hydraulic motor located within one of the segments;
    an air compressor attached to the vehicle;
    a hydraulic line having a first end and a second end, the first end of the hydraulic line attached to the air compressor, the second end of the hydraulic line attached to the hydraulic motor; and
    a control panel mounted on a dashboard within an interior of the vehicle, the control panel attached to the air compressor, the control panel having a plurality of switches for controlling the hydraulic motor;
    wherein the base has a diameter greater than any of the segments.

2. The jack apparatus of claim 1 wherein the safety clip has a first end secured to the top end of the top segment and a second end secured to the bottom end of the top segment.

3. The jack apparatus of claim 2 wherein the safety clip extends horizontally away from the top end of the top segment and angles back toward the bottom end of the top segment, the horizontal portion of the safety clip contacting the vehicle.

4. The jack apparatus of claim 1 and further comprising:
    a plurality of jack apparatuses;
    wherein each jack apparatus is independently controllable by the control panel.

5. The jack apparatus of claim 1 wherein the base is fixedly mounted to the bottom segment in a non-rotational manner.

6. The jack apparatus of claim 1 wherein the plurality of jack apparatuses numbers two.

* * * * *